INVENTOR.
RALPH FEDER
KEN W. ASAI
HAROLD P. CHARBNAU
RUDY MANNHEIMER

Sept. 24, 1968     R. FEDER ET AL     3,402,632
METROLOGY METHOD FOR CRYSTAL DEFECT DETECTION
Filed March 18, 1965     3 Sheets-Sheet 2

INVENTOR.
RALPH FEDER
KEN W. ASAI
HAROLD P. CHARBNAU
RUDY MANNHEIMER 3,402,632
METROLOGY METHOD FOR CRYSTAL
DEFECT DETECTION
Ralph Feder, Croton-on-Hudson, Ken W. Asai, Mahopac,
Harold P. Charbnau, Putnam Valley, and Rudy Mann-
heimer, Thornwood, N.Y., assignors to the United States
of America as represented by the United States Atomic
Energy Commission
Filed Mar. 18, 1965, Ser. No. 440,963
2 Claims. (Cl. 88—14)

ABSTRACT OF THE DISCLOSURE

Method for studying the equilibrium concentration of defects in crystals by determining the macroscopic and lattice expansions in large, high purity, ionic crystals, wherein the sample is heated and cooled to equilibrium in a transparent liquid in a heat sink in a cycle between —50° and +100° C. while means having a laser of large coherence length and low spectral half width reversibly productes two sets of light interference fringe lines whose movement reversely corresponds to the temperature change and expansion and contracton history of the specimen during the entire heating and cooling cycle, and the two sets of fringe lines are visually, remotely and automatically recorded easily and accurately in ambient room light with a high signal to-noise ratio whereby the difference between the respective sets of fringe lines is compared for reaching and maintaining different equilibrium temperatures in the crystal without overshoot and undershoot for the simple, accurate, remote and automatic determination of the defects in the crystalls.

Figure 1:
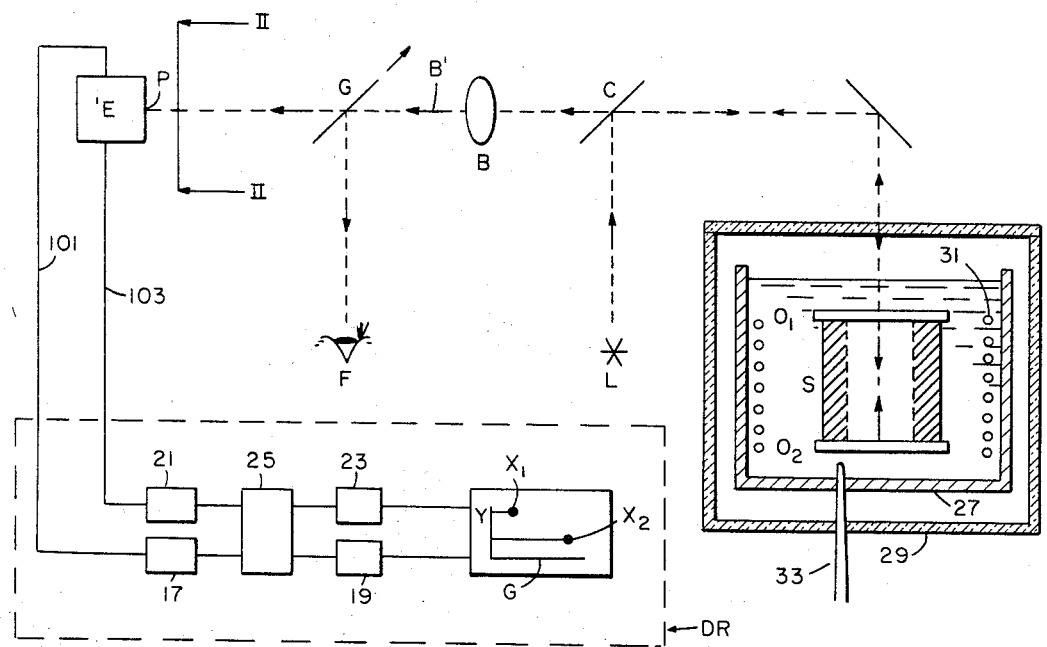

This invention relates generally to temperature mensuration and in particular, to a novel interferometric-dilatometer system for measuring the temperature change of a specimen. This invention was made in the course of, or under a contract with the United States Atomic Energy Commission.

In the field of physics a need exists for a instrument capable of measuring absolutely to a small part of a degree the precise temperature change of a specimen used in studying defects in materials. These specimens comprise metallic or ionic crystals and are of interest especially when large specimens are heated and cooled in a cycle. Mechanical and electrical devices and conventional thermometers for temperature measurement do not operate properly since they comprise apparatus directly coupled to the specimen. Others such as optical pyrometers either integrate over too small a volume, are too expensive, complicated or inaccurate, do not operate automatically remotely, or do not measure the temperature change of the specimen absolutely. Additionally, it is desirable to prevent normal laboratory room ambient conditions from interfering with the specimen temperature change measurement.

It is an object of this invention, therefore, to provide an economical and practical apparatus and method for the analysis of small absolute temperature changes in a specimen by providing high precision dilatometer in the form of an interferometer for providing moving light interference fringe lines corresponding to the temperature change in a specimen and means for detecting and counting these fringe lines to determine the temprature change in the specimen;

It is a further object to provide means for automatically counting the number of these interferometer fringe lines passing a slit in such in such a way as to compensate for any overshoot or undershoot in temperature in the specimens approach to equilibrium;

A further object is to provide a temperature measuring instrument that will cause the least interference with the specimen temperature and/or expansion;

A still further object is to provide an interferometric-dilatometer system that is effective in normal room ambient conditions for measuring the temperature change in a large specimen.

By the present invention, an interferometric-dilatometer device is provided that is useful in accurately measuring to within a few hundredths of a degree absolute the temperature change of a sodium specimen up to five centimeters or more in length, that is heated and cooled in a cycle from —50° to +100° C. The method and construction involved in this invention utilize standard and well known techniques and apparatus and are highly flexible for a wide range of applications, temperatures, temperature changes, specimen sizes, and specimen materials. More specifically, this invention involves a system for producing and detecting light interference fringe lines whose movement corresponds to the specimen temperature change. This system is arranged, in one embodiment, to focus and divide the light interference fringe so that the fringe lines of the divided fringe move past slits, and to detect these fringe lines passing through the slits for automatic counting and recording that corrects for any overshoot or undershoot in the temperature of the specimen in its approach to equilibrium. With the proper selection and arrangement of the components the desired measurement is obtained.

The above and further objects and novel features of this invention will appear more fully from the following detailed description when the same is read in connection with the accompanying drawings. It is to be expressly understood, however, that the drawings are not intended as a definition of the invention but are for the purposes of illustration only.

Figure 2:
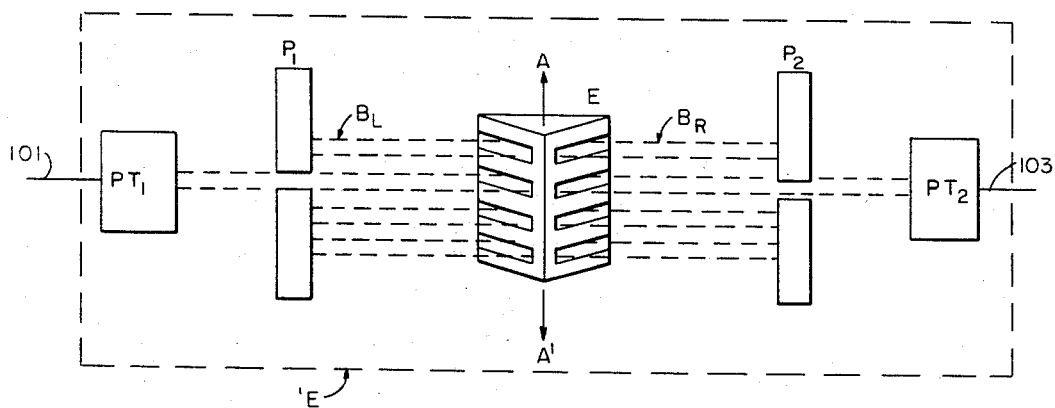
Figure 3:
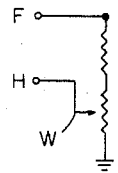
Figure 4:
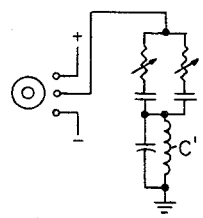
Figure 5:
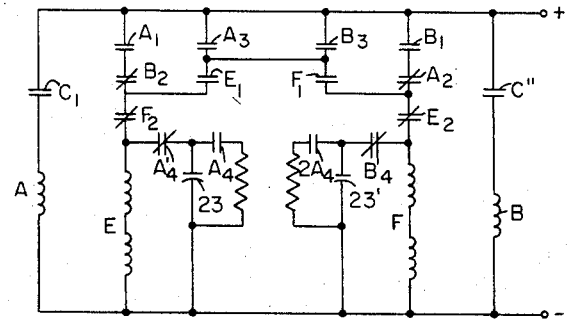
Figure 6:
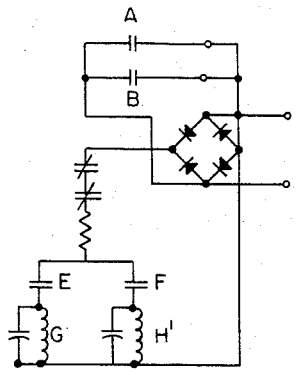
Figure 7:
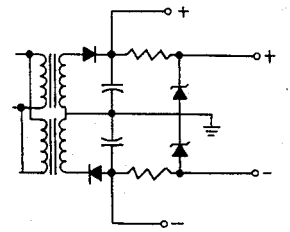
Figure 8:
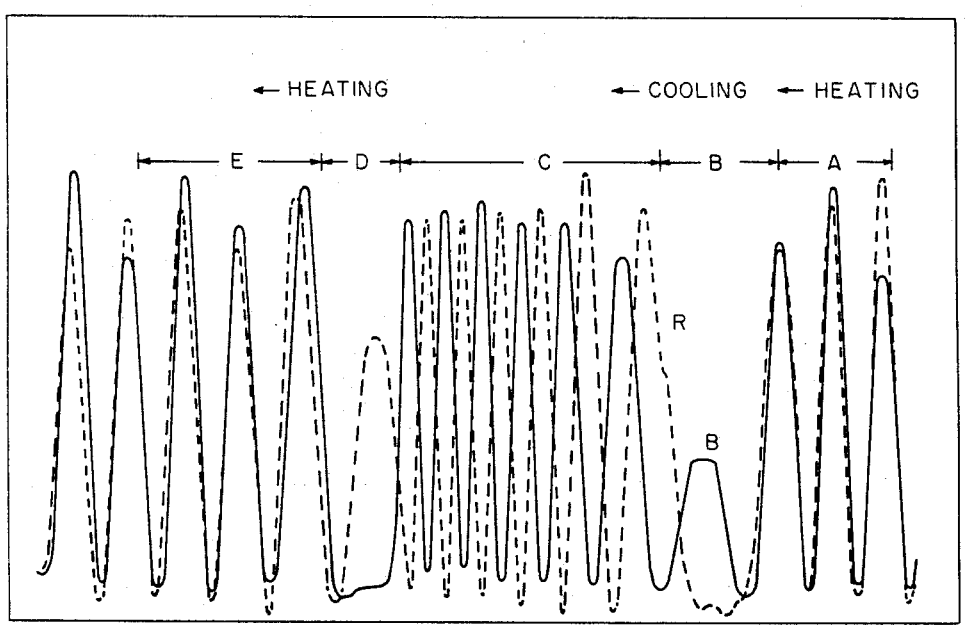

In the drawings where like parts are marked alike:
FIG. 1 is a partial diagrammatic illustration of the principles involved in this invention;
FIG. 2 is a partial cross-section of the apparatus of FIG. 1 through II–II.
FIG. 3 is a schematic illustration of electrical components for the apparatus of FIG. 2;
FIG. 4 is a schematic illustration of further electrical components for the apparatus of FIG. 3;
FIG. 5 is a schematic illustration of further electrical components for the apparatus of FIG. 3;
FIGS. 6 and 7 are schematic illustrations of further electrical components for the apparatus of FIG. 3;
FIG. 8 is a partial representation of an actual recording trace.

It is known that the length of a cylindrical solid specimen changes according to the absolute temperature of the specimen. This is based on the well known thermal expansion (and contraction) of solid material due to the increase and decrease in the movement of the specimen atoms as the specimen is heated and cooled. For a given size specimen a predetermined expansion (and/or contraction) occurs depending linearly on the temperature change of the specimen. The invention hereinafter descirbed utilizes this well known relationship in measuring the temperature of the specimen.

In order to understand how the method and apparatus of this invention accomplishes the function of measuring the temperature of the specimen, reference is made to FIGS. 1 and 2 wherein are illustrated two transparent optical flats $O_1$ and $O_2$ separated by a cylindrical specimen S of predetermined dimensions. As is well known, these flats produce light interference bands in response to light directed against the flats from a light source of a single wave length. These bands are based on the fact that part of this light passes through one of the flats and reflects from the top of the bottom flat to cancel light of the same wave packet transmitted through the bottom surface of the top flat. Thereupon this cancellation produces alternate light and dark interference bands, hereinafter called fringe lines. As the specimen is heated or cooled the expansion or contraction of the specimen produces a corresponding movement in the flats and the fringe lines produced thereby. Thus by moving the fringe lines past appropriate slits the fringe lines can be counted and this count corresponds to the temperature change of the specimen.

In accordance with one embodiment of this invention, an interference fringe line producing light beam source L is reflected from the half silvered mirror C and again reflected by the mirror D onto the optical flats $O_1$ and $O_2$. S represents a sodium specimen in the form of a right circular cylinder. The fringe formed on the lower part of optical flat $O_1$ is reflected from D and passes through the half silvered mirror C. The lens B projects and focusses the fringe at some point P. Mirror G can be moved in and out of the beam B' to observe the fringe by eye at F. Mirror G is moved out of the beam B' and the fringe is divided in two parts and reflected by the 90° prism E (shown in cutaway II—II in FIG. 2). The fringe then passes through slits $P_1$ and $P_2$ onto the photomultiplier tubes $PT_1$ and $PT_2$, illustrated schematically as 'E in FIG. 1.

The signals are fed to a counting system 13 and into an $X_1$, $X_2$ recorder 15. Slit $P_2$ is displaced by about ¼ of a fringe line width with respect to slit $P_1$. This means that the recorder pen $X_2$ is 90° out of phase with respect to recording pen $X_1$. By heating specimen S and using a series of relays 17 triggered by the signal fed in by the photo tubes, counter 19 operates only if fringe $P_1(X_1)$ is leading fringe $P_2(X_2)$ and both have completely passed their respective slits. Similarly another set of relays 21 operates a second counter 23 if fringe $P_2(X_2)$ leads fringe $P_1(X_1)$. These relays actuate a flip flop circuit 25 so that a count is made in counter 19 or 23 of the fringe that is leading. Thus counter 19 represents the number of fringe lines due to heating and counter 23 represents the number of fringe lines due to cooling. The difference between the two counters 19 and 23 gives the number of fringe lines, correct to the nearest whole number, that the expansion (or contraction) produces at the final equilibrium temperature. The remaining fractional correction can be estimated from the position of the pens on the recorder. A reading made to 1/10 of a fringe line represents a change in specimen length of $\lambda/20$ for a one centimeter specimen. For the five centimeter specimen adopted in this actual embodiment, a precision of $6\times10^{-7}$ is obtained.

Practical electronic circuits for accomplishing the counting according to this embodiment are illustrated schematically in FIGS. 3 through 6. As the interference fringe starts to pass the first slit $P_1$ of $PT_1$, slide wire contact $O_1$ actuates relay C', closing contact $C_1$. Further, as the fringe starts to pass the second slit $P_2$ of $PT_2$, slide wire $O_2$ actuates relay C'', closing contact $C_2$. As relays C' and C'' are actuated, the other circuit elements are actuated, as described hereinafter.

As $C_1$ closes, relay A is actuated, closing contacts $A_1$, $A_3$, $A_4$ and opening $A_2$, $A'_4$, and $A_5$. Relay E is also energized, thereby closing contacts $E_1$, $E_3$ and opening $E_2$. Relay E is now energized through parallel circuits $A_1$, $B_2$, $F_2$ and $A_3$, $E_1$, and $F_2$.

When the fringe passes $PT_2$ energizing C'' thereby closing contact $C_2$, relay B is then actuated closing contacts $B_1$, $B_3$, $B_4$ and opening contacts $B_2$, $B_4$ and $B_5$. Relay E is now held closed through paths $A_3$, $E_1$, $F_2$ and $B_3$, $E_1$ and $F_2$.

As the fringe passes $PT_1$, contact C, opens de-energizing relay A so that contacts $A_1$, $A_3$, and $A_4$ open and contacts $A_2$, $A_4'$, and $A_5$ close. At this time, relay E is still energized through path $B_3$, $E_1$ and $F_2$. Also the 8 μf. capacitor 23 is now charged.

As the fringe passes $PT_2$ relay C'' is de-energized opening contact $C_2$. Relay B is now de-activated opening contacts $B_1$, $B_3$, $B_4$ and closing contacts $B_2$, $B_5$ and $B'_4$. Also, the 8 μf. capacitor 23 discharges through contact E, which is closed momentarily, whereby counter G is activated. The system is thus at its starting point.

Originally a Hg lamp was used as the light source L but the spectral half width of this source was so large that the coherence length was only 3 cm. This precluded using a specimen greater than 1 cm. Another major drawback was a low light intensity. Indeed, the signal to noise ratio was so low that any extraneous pick up (either electrostatic or stray light) decreased the precision to such an extent that it was impractical to record the fringe lines. To overcome this problem a He-Ne laser was utilized as the light source L. The system now has an extremely high signal to noise ratio, such that room lights can remain on and no noise is introduced by normal activity in the laboratory. Furthermore, the coherence length of the laser light source ($\lambda=6380$ A.) is extremely large. With a spectral half width of 0.01 A. or less, one can obtain good interference patterns with differences in path length of 40 cm. or more.

There are many reasons for selecting the interferometric method for dilatometric measurements. First, no push rod is required to couple the specimen to a sensing device, thereby eliminating the possibility of undesirable effects due to sticking friction. Secondly, the load imposed on the specimen by the optical flat is very small. Thirdly, the expansion is measured absolutely; the Ne wavelength is the built in standard. Finally, the precision is greater for larger specimens than that obtainable by other techniques.

A well stirred constant temperature bath 27 is used to regulate the temperature of the specimen, which is enclosed in a quartz enclosing 29 containing argon. Alcohol is used as the bath liquid for temperatures between $-50°$ to $+20°$ C., while silicone oil is used between $+20°$ to $+100°$ C. Alternately wound heating and cooling coils 31 are used to reach and maintain any temperature between $-50°$ and $+100°$ C. Temperature control to within a few hundredths of a degree is obtained by the use of a platinum resistance thermometer 33.

In the operation of a typical heating (or cooling) cycle the temperature change of specimen S produces an interference fringe beam B' that is directed into detector 'E. This detector divides the fringe beam B' into fringe beams $B_L$ and $B_R$ having fringe lines whose movements past slits $P_1$ and $P_2$ correspond to the temperature change of specimen S. Every time the light between the fringe lines in beams $B_L$ and $B_R$ passes photomultiplier $PT_1$ and $PT_2$ the photomultipliers produce an output signal which is transmitted into detector recorder DR through leads 101 and 103.

The fringe lines in beam $B_L$ lead the fringe lines in beam $B_R$ during the heating of specimen S so that the signal in lead 101 and 103 actuates flip-flop switch 25 through relay 17 and 21 respectively to actuate counter 19 for counting the fringe lines first moving past slits $P_1$ and then $P_2$ due to the heating of specimen S. Thereupon the pen $X_1$ and $X_2$ in recorder 15 display traces whose distances from the Y recorder axis corresponds to the temperature increase in specimen S.

In this stage of the cycle preparatory to the cooling of specimen S the fringes in $B_L$ and $B_R$ move past slits $P_1$ and $P_2$ illuminating $PT_1$ and $PT_2$, respectively. The signal from $PT_1$ closes contact $C_1$ and energizes relay A, thereby closing contacts $A_1$, $A_3$ and $A_4$ and opening $A_2$, $A'_4$ and $A_5$. The signal from $PT_2$ then closes contact $C_2$, energizing relay B, whereupon contacts $B_1$, $B_3$ and $B_4$ close and contacts $B_2$ and $B'_4$ open. As the fringe $B_L$ completes its pass by slit $P_1$ the decrease in signal from $PT_1$ de-energizes relay A so that all A contacts return to their normally open or closed position. The trailing $B_R$ fringe now completes its pass by slit $P_2$ de-energizing relay B so that all B contacts return to their normally open or closed positions. At this point capacitor 23, in flip-flop 25 which was charged while E was energized and $A'_4$ was closed, now discharges through relay E which closes $E_3$ momentarily. At this point counter 19 is activated to complete the cycle. The counting system is now cleared and ready for the next counting sequence.

In the cooling stage the sequence of operations is reversed and counter 23 is activated for counting. The number of fringes plus the equilibrium position of the $X_1$ or $X_2$ pen corresponds to the decrease in temperature of the specimen.

Neither counter will be actuated if a temperature reversal takes place and the fringes ($B_L$, $B_R$) do not complete one of the above sequences.

The recorder used in this experiment normally operates with the "red" pen ($X_1$) about 1/8" behind the "blue" pen ($X_2$). Section A represent a heating cycle. In this case the adjustment made was for the "blue" to lead the "red." Upon reducing the temperature, the sequence of "blue" leading "red" is reversed so that after going through the reversal as shown in "B" we begin cooling the specimen as shown in section "C". The behavior of the pens during the reversal in section "B" is such that the blue pen has begun to show the approach of the next fringe whereas the red pen, displaced approximately 1/4 of a fringe, continues to see the trough between two fringes. The large width of this trough for the "red" pen shows that the fringe is reversing, and the decrease in intensity of the "blue" pen indicates the same reversal. The change from section "C" to section "D" again shows a reversal from cooling to heating. This is shown in FIG. 8.

It should also be noted that one counter was actuated for each fringe in section "A". However, due to the incomplete sequence of operations in section "B," no count was recorded. Fringes in section "C" actuated the other counter but did not count the incomplete fringe sequence in section D.

At the beginning of any cycle whether it be a cooling or heating cycle the flip-flop 25 can be adjusted manually to actuate the respective recorder pens $X_1$ and $X_2$ in the proper sequence. To this end the slide contact in FIG. 4 is suitably adjusted. Thereupon the input from the proper photomultiplier (e.g. $PT_2$) enters the potentiometer shown in FIG. 3 and is transmitted to the proper counter by the wiper W shown in this figure. FIGURE 6 and 7 illustrate schematically the power systems for the circuits of FIGS. 3, 4 and 5.

For purposes of illustration the following table lists the values or model numbers of the components used:

Element:
- A ..... Relay—Sigma 42 RO–1000 S. SIL.
- B ..... Relay—IBM 6 pole.
- C' ..... Relay—Sigma 42 RO–1000 S SIL.
- C" ..... Relay—Sigma 42 RO–1000 S SIL.
- O ..... Connection to slide wire in recorder.
- E ..... Counter—Veeder-Root T120506, 115 VA6.
- F ..... Input from photomultiplier.
- H ..... Output to 1 mv. recorder.
- $R_1$ ..... 100 Ω 10 W.
- $C_1$ ..... 100.
- $D_1$ ..... 1.5M 15210.
- $S_1$ ..... +15 v. DC.
- $S_2$ ..... −15 v. DC.
- $S_3$ ..... 117 v. AC.
- $T_1$ ..... 25 v.

This invention has the advantage of providing absolute measurements of the temperature changes and rate of temperature changes of a specimen to within .001° C. and in actual tests a precision of $6 \times 10^{-7}$ has been obtained. This system, moreover enables an observer to determine the history of an automated heating and/or cooling experiment. Also, this invention provides for such accurate measurements of a wide range of specimen materials and sizes over a broad cyclic temperature range. Additionally, this invention provides for the automatic, remote, temperature measurement of a single large specimen in normal room ambients in a simple, efficient and inexpensive manner without direct mechanical or electrical coupling between the specimen and the measuring system.

What is claimed is:

1. The method of studying crystal defects in a high purity, annular, cylindrical, ionic-crystal over 1 cm. in length having a central axis around a bore terminated by opposite parallel ends whose relative movement corresponds to the atomic thermal motion of atoms in the crystal lattice, comprising the steps of:

(a) immersing the crystal in a bath of transparent liquid selected from the group consisting of alcohol and silicone oil in a closed transparent enclosure containing a rare gas above the level of said liquid;

(b) supporting one of said parallel ends of the crystal on a first optical flat while supporting a second optical flat on said opposite parallel end of said crystal to receive light in a path that passes through said enclosure, said gas, said liquid, and said crystal and between said flats along said axis of the bore of said crystal;

(c) transmitting unfiltered light of a single wave length having a coherence length of 6380 A. and a spectral half width of only up to 0.01 A. sequentially in said path and through a prism to produce two sets of light interference fringe lines that reversibly move correspondingly with the movement and direction of movement of said opposite crystal ends relative to each other for producing differences in path lengths of at least 40 cm. with a high signal to noise ratio in ambient room light;

(d) reversibly, continuously, detecting the movement and direction of movement of said two sets of fringe lines in ambient room light at different relative phase positions;

(e) producing two respective visual records of the amount and direction of said movement of said two sets of fringe lines detected; and (f) cycling the temperature of said bath between predetermined limits from −50° to +100° C. for comparing the two respective visual records for reaching and maintaining the final equilibrium temperature of the crystal at different temperatures between said limits without overshooting and undershooting said limits whereby the relative thermal movement of said crystal lattice atoms can be determined accurately and remotely at different temperatures.

2. The method of studying crystal defects in a large, high purity, annular, cylindrical, ionic-crystal having a central axis around a bore terminated by opposite parallel ends whose relative movement corresponds to the atomic thermal motion of atoms in the crystal lattice, comprising the steps of:

(a) sequentially immersing the crystal in a liquid bath selected from the group consisting of alcohol and silicone oil in a closed quartz container containing argon above the liquid;

(b) supporting one of said parallel ends of said crystal on a first optical flat while supporting a second optical flat on said opposite parallel end of said crystal to receive light in a path that passes through said enclosure and between said flats along said axis of said crystal;

(c) transmitting coherent light of a single wave length having a coherence length of 6380 A. and a spectral half width of only up to 0.01 A. from a He-Ne laser in said path to produce light interference fringe lines that only move in a direction corresponding to the movement and direction of movement of said opposite crystal ends relative to each other;
(d) splitting said fringe lines with a prism to produce separate sets of fringe lines;
(e) detecting the movement of said separate sets of fringe lines at different phase positions;
(f) producing a visual record of the amount of said movement of said separate sets of fringe lines;
(g) determining the direction of movement of said separate sets of fringe lines by detecting the different phase positions of said two sets of fringe lines;
(h) actuating a heating coil immersed in said bath around said crystal to increase the temperature of said bath to move said separate sets of fringe lines in one direction;
(i) actuating a cooling coil immersed in said bath around said crystal to decrease the temperature of said separate sets of fringe lines in the opposite direction;
(j) and controlling said bath temperatures at predetermined limits from −50° to +100° C. by maintaining the fringe lines stationary for maintaining said crystal in equilibrium at said predetermined limits without undershooting and overshooting said limits whereby the relative thermal movement of the atoms in said crystal lattice can be determined accurately at different temperature limits above and below ambient room temperatures.

References Cited

UNITED STATES PATENTS 2,479,802   8/1949   Young _____ 88—14

OTHER REFERENCES

Branin, F., Jour. Opt. Soc. Amer., vol. 43, No. 10, October 1953, pp. 839–848, Bidirectional Counter for Interferometry.

Morokuma, Interference Comparator for Routine Measurement of Length, pp. 30–36, Oyo Buturi, vol. 31, No. 3, March 1962.

Green et al., Recording Interfer. Dilatometer, Instr. & Control Syst., vol. 32, pp. 882–885, June 1959.

Morokuma, Interf. Fringes Using Laser, Jour. Opt. Soc. Amer., vol. 53, No. 3, March 1963, pp. 394–395.

Bottom, Fabry-Perot Dilatometer, Review of Sci. Inst., vol. 35, No. 3, pp. 374–376, March 1964.

Hara et al., Length Meas. by Fringe Counting, Rev. of Sci. Inst., vol. 30, No. 8, August 1959, pp. 707–709.

JEWELL H. PEDERSEN, *Primary Examiner.*

B. LACOMIS, *Assistant Examiner.*